United States Patent

Hori et al.

[11] Patent Number: 5,889,929
[45] Date of Patent: Mar. 30, 1999

[54] PRINTER SYSTEM FACILITATING MATCHING OF BRIGHTNESS AND COLOR OF DISPLAYED AND PRINTED IMAGES

[75] Inventors: Masaaki Hori, Tajimi; Yasunari Yoshida, Ama-gun; Koji Kobayakawa, Ichinomiya; Masaaki Hibino, Yokkaichi; Kiyotaka Ohara; Masashi Ueda, both of Nagoya, all of Japan

[73] Assignee: Brother Kogyo Kabushiki Kaisha, Nagoya, Japan

[21] Appl. No.: 856,974

[22] Filed: May 15, 1997

[30] Foreign Application Priority Data

May 15, 1996 [JP] Japan ..................................... 8-120439

[51] Int. Cl.⁶ ................................................. G06K 15/00
[52] U.S. Cl. ............................................ 395/109; 395/101
[58] Field of Search ...................................... 395/101, 109, 395/115, 116; 347/133, 131, 188, 191; 345/431, 432, 117, 141, 142, 147, 153, 154; 707/527–528; 358/518–523, 527, 531, 461

[56] References Cited

U.S. PATENT DOCUMENTS 5,081,529 1/1992 Collette ................................... 358/527
5,381,349 1/1995 Winter ..................................... 358/519

*Primary Examiner*—Arthur G. Evans
*Attorney, Agent, or Firm*—Oliff & Berridge, PLC

[57] ABSTRACT

The first time a print program is activated, monitor calibration for calculating display characteristic of a display is executed (S10). Then the results of the monitor calibration operation are registered along with the present date (S20). The monitor calibration results and print information are outputted to a color printer (S30). The next and further times that the print program is activated, the number of days passed since the monitor calibration operation was last performed is calculated based on the previously registered date and on the present date (S40). Whether the calculated number of days exceeds a predetermined number of days is determined (S50). If so, then the monitor calibration operation is again performed (S60) and the calibration results and date are updated accordingly (S70).

11 Claims, 5 Drawing Sheets

FIG. 6
| ID NUMBER | REGISTRATION DATE AND TIME | COLOR CORRECTION INFORMATION |
|---|---|---|
| I D 3 0 4 9 8 4 | 1 9 9 6 / 0 7 / 0 8  1 2 : 3 4 | * * * * * * * |
| I D 3 0 4 9 8 5 | 1 9 9 6 / 0 6 / 1 5  1 6 : 2 7 | * * * * * * * |
FIG. 7
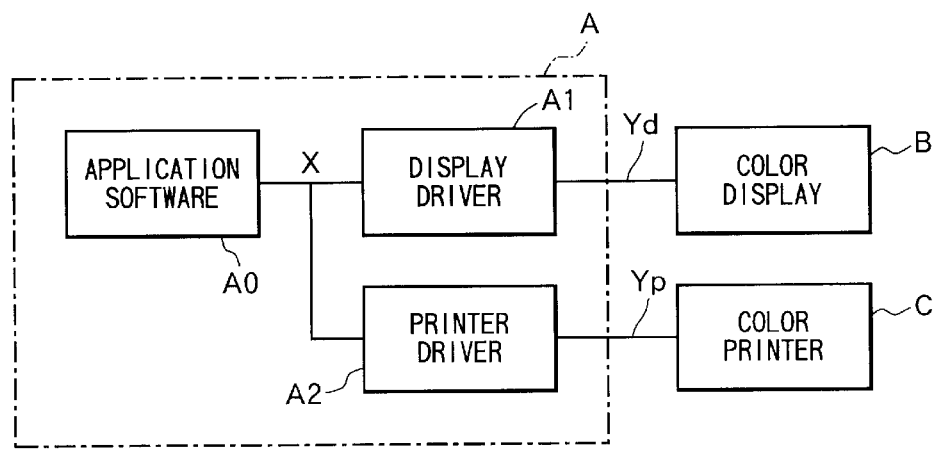
FIG. 8
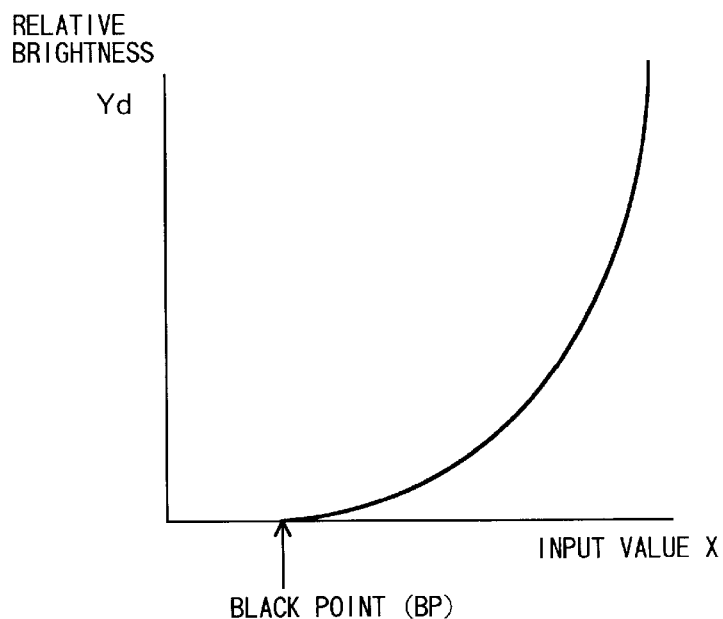

PRINTER SYSTEM FACILITATING MATCHING OF BRIGHTNESS AND COLOR OF DISPLAYED AND PRINTED IMAGES

BACKGROUND OF THE INVENTION

1. Field of the Invention

The present invention relates to a printer system including a printer and a display connected to a personal computer.

2. Description of the Related Art

There has been known a printer system enabling editing and printing of color images using a personal computer. As shown in FIG. 7, the printer system includes a personal computer A connected to a color display B and a color printer C.

In order to obtain a desired color, a user uses the application program A0 to change an input value X applied to a display driver A1. When the color display B displays the color as desired by the user, the user starts printing operations using the color printer C. At this time, the input value X is outputted to the color printer A2 and printing of the desired color is performed based on the input value X.

It is desirable that a displayed color Yd displayed on the display B be the same as a printed color Yp printed by the printer C. However, the color display B normally has a display characteristic that is non-linear as shown in FIG. 8. Also, although colors displayed on the color display B have the color components of red (R), green (G), and blue (B), the colors printed by the color printer B have the color components of yellow (Y), magenta (M), cyan (C) and black (K). It is therefore difficult to match displayed colors with printed colors.

In order to match the colors displayed on the color display B with the color printed by the color printer C, it has been necessary to calculate the display characteristic of the display B and then correct the input value inputted to the color printer C accordingly.

However, the display characteristic of the display B changes with time. Therefore, if the input value is always corrected based on the same display characteristic, then as time passes the colors printed the color printer C will gradually appear different from colors displayed on the color display B.

Also, correction of the input value inputted to the color printer C can not be performed at all when the color display B is exchanged for a different type of display.

SUMMARY OF THE INVENTION

It is an object of the present invention to overcome the above-described problems and to provided a printer system enabling a user to correctly grasp the display characteristic of the display and improve the match between colors displayed on the display and colors printed by the printer.

To achieve the above and other object, there is provided a printer system that includes a display, a printer, an image data producing means, a display characteristic calculation means, a display characteristic memory, a print data adjusting means, a necessity determination means, and a calculation operation execution means. The image data producing means is connected to the display and the printer and produces image data to be inputted to the display and the printer. The display characteristic calculation means calculates a display characteristic relating to the input level of the image data inputted to the display versus a relative brightness of an image displayed on the display in response to the image data. The display characteristic memory stores information relating to the calculated display characteristic. Based on the information relating to the calculated display characteristic stored in the display characteristic memory, the print data adjusting means adjusts the input level of the image data inputted to the printer so that an image printed by the printer substantially matches with the image displayed on the display. The necessity determination means automatically determines necessity of the display characteristic calculation unit to calculate the display characteristic. The calculation operation execution means executes a calculation operation of the display characteristic calculation unit when the necessity determination unit determines it is necessary for the display characteristic calculation unit to determine the display characteristic.

With this configuration, whether or not the display characteristic calculation means needs to again calculate the display characteristic of the display is automatically determined. The display characteristic calculation means executes calculation operations according to this necessity.

The necessity determination means determines it is necessary for the display characteristic calculation means to determine the display characteristic when a time duration from when the display characteristic stored in the display characteristic memory exceeds a predetermined time duration.

With this configuration, it is assumed that the display characteristic of the display will change with passage of time so that when the passage of time exceeds a predetermined time duration, the display characteristic is recalculated.

The necessity determination unit determines it is necessary for the display characteristic calculation unit to determine the display characteristic based on ID information relation to the display connected to the image data producing unit.

With this configuration, when the display is exchanged for a different one, this exchange can be automatically determined by referring to the ID information of the new display. As a result, the display characteristic can be recalculated.

BRIEF DESCRIPTION OF THE DRAWINGS

The above and other objects, features and advantages of the invention will become more apparent from reading the following description of the preferred embodiment taken in connection with the accompanying drawings in which:

FIG. 6 is a schematic view showing an ID table stored in the personal computer of the third embodiment;

FIG. 7 is a block diagram showing configuration of a conventional printer system; and FIG. 8 is a graphical representation of the relationship between relative brightness and an input value of a conventional display.

DETAILED DESCRIPTION OF THE PREFERRED EMBODIMENTS

A printing device according to a first embodiment of the present invention will be described while referring to FIGS. 1, 2(a) through 2(c).

Figure 1:
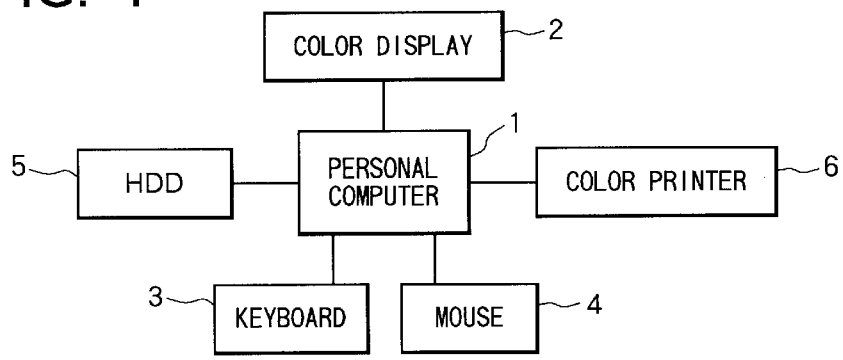
FIG. 1 is a block diagram showing configuration of a printer system according to a first embodiment of the present invention.

As shown in FIG. 1, the printer system of the present embodiment includes a personal computer 1 and a color display 2 connected to the personal computer 1. The personal computer 1 is also connected to a keyboard 3, a mouse 4, a hard disk 5, and a color printer 6. The personal computer 1 is installed with print programs represented by the flowcharts in FIGS. 2(a) and 2(b). The color printer 6 is installed with the print program represented by the flowcharts in FIG. 2(c).

Figure 2:
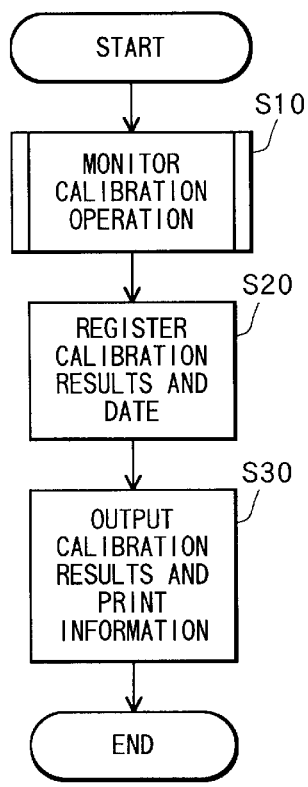
FIG. 2(a) is a flowchart representing a print program executed by a personal computer of the first embodiment the first time the personal computer is activated.
FIG. 2(b) is a flowchart representing a print program executed by the personal computer of the first embodiment the second and subsequent times the personal computer is activated.
FIG. 2(c) is a flowchart representing a print program executed by a color printer of the first embodiment.
Figure 2:
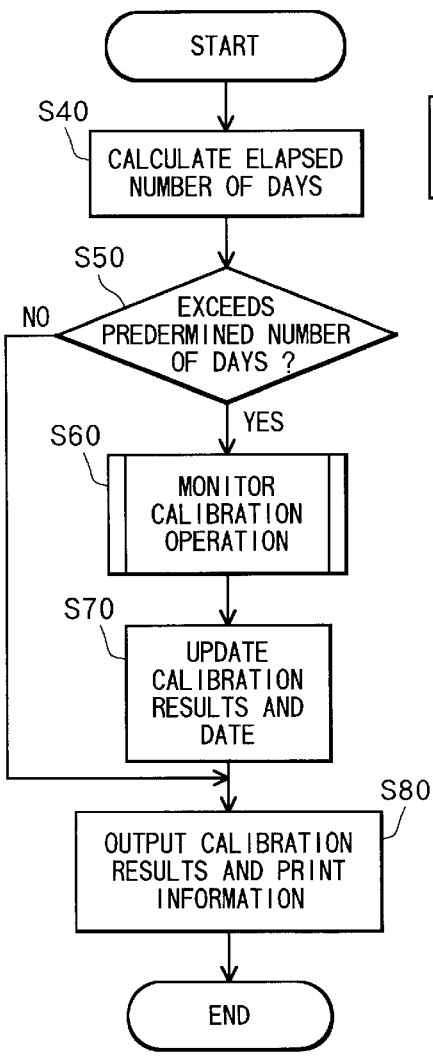
Figure 2:
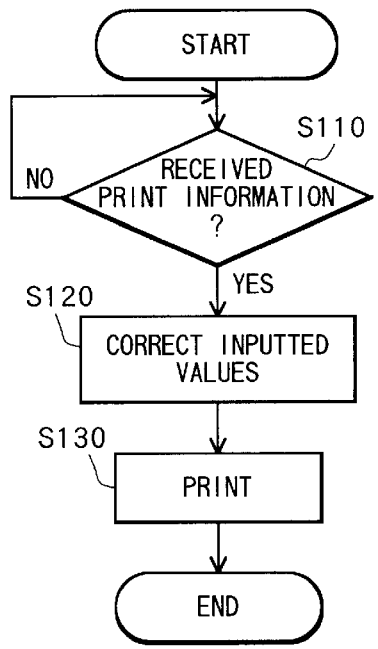

The first time the print program is activated, as shown in FIG. 2(a), in S10 a monitor calibration operation is performed to calculate the display characteristic of the display 2. Then in S20, the results of the monitor calibration operation are registered along with the present date. In S30, the monitor calibration results and print information are outputted to the color printer 6.

The next and further times that the print program is activated, as shown in FIG. 2(b), in S40 the number of days passed since the monitor calibration operation was performed in S10 is calculated based on the date registered in S20 and on the present date. Then it is determined in S50 whether or not the number of days calculated in S40 exceeds a predetermined number of days. If so (S50:YES), then in S60 the monitor calibration operation is again performed. In S70, the calibration results and date registered in S20 are updated using the results of the monitor calibration operation performed in S60 and the present date. Then, in S80, the monitor calibration results registered in S70 and print information are outputted to the color printer 6.

When it is determined in S50 that the number of days calculated in S40 does not exceed the predetermined number of days (S50:NO), then the program proceeds directly to S80, whereupon the presently registered calibration results are outputted with print information to the color printer 6. According to the flowchart of FIG. 2(b), the monitor calibration operation will again be performed each time the predetermined number of days is exceeded.

as shown in FIG. 2(c), the color printer 6 determines in S110 whether or not it has received print information from the personal computer 1. If so (S110:YES), then in S120 the inputted values are corrected based on the calibration results inputted with the print information. Then printing is performed in S130. Therefore, each time print information from the personal computer 1 is received by the color printer 6, the inputted values will be corrected based on the calibration results accompanying the print information.

With this configuration, monitor calibration is automatically updated before the display characteristic of the color display 2 changes too drastically with time. As a result, printing can always be performed based on the most recent calibration results so that printed colors will always match displayed colors.

Next, a printer system according to a second embodiment of the present invention will be described while referring to FIGS. 3(a) through 3(c).

The printer system of the second embodiment includes the same components as the printer system explained with reference to FIG. 1 in the first embodiment. In the second embodiment, however, the personal computer 1 is installed with print programs represented by the flowcharts of FIGS. 3(a) and 3(b) and the color printer 6 is installed with a print program represented by the flowchart of FIG. 3(c).

Figure 3:
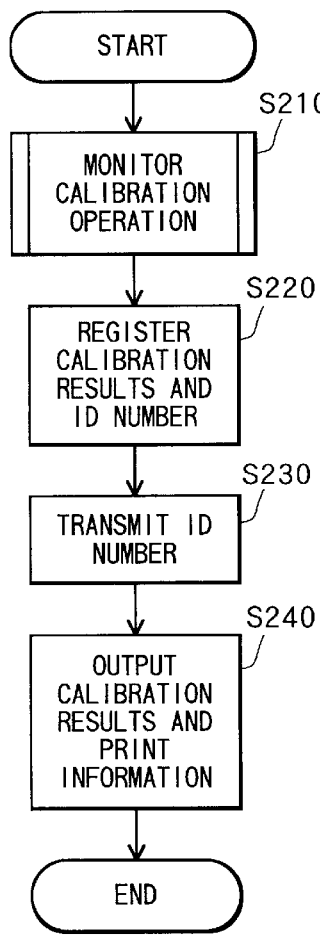
FIG. 3(a) is a flowchart representing a print program executed by a personal computer according to a second embodiment of the present invention the first time the personal computer is activated.
FIG. 3(b) is a flowchart representing a print program executed by the personal computer of the second embodiment the second and subsequent times the personal computer is activated.
FIG. 3(c) is a flowchart representing a print program executed by a color printer of the second embodiment.
Figure 3:
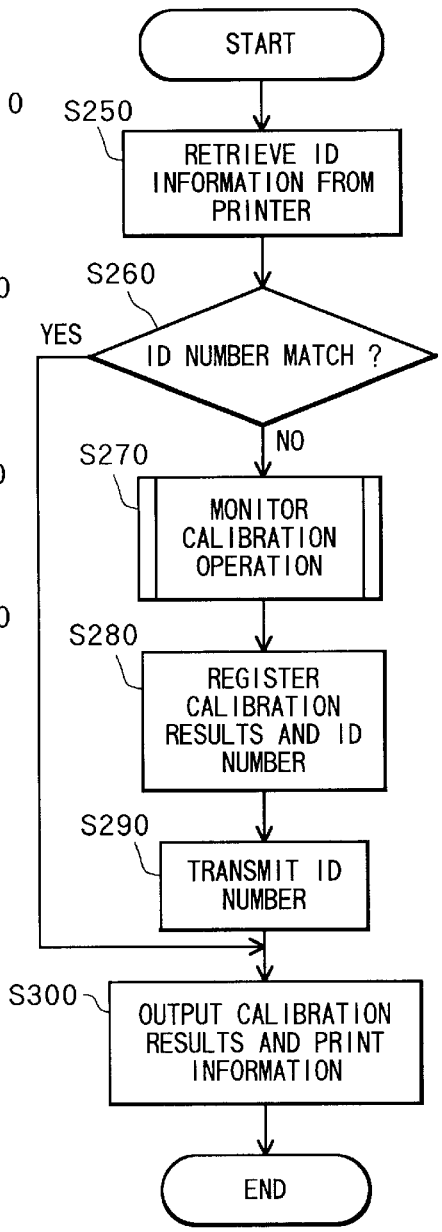
Figure 3:
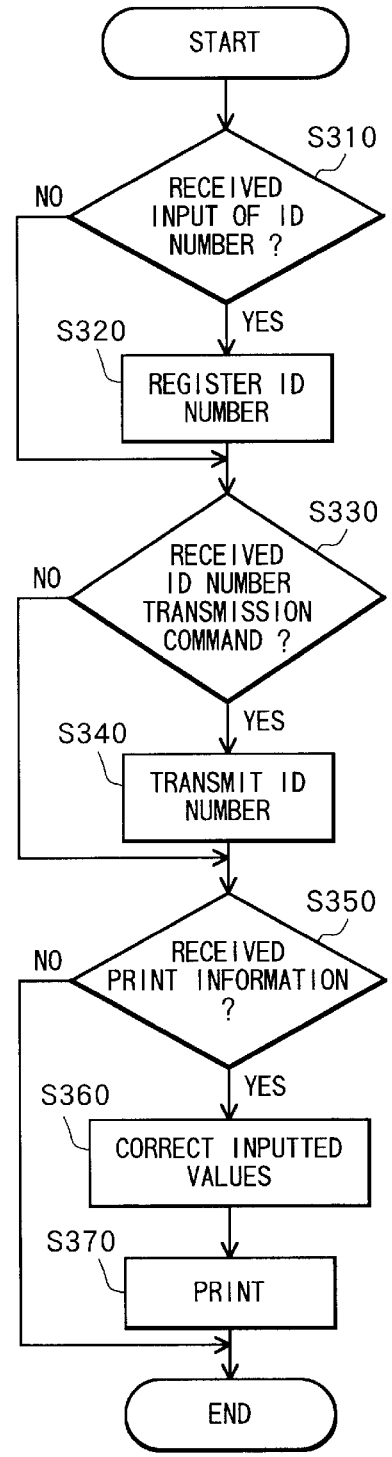

The first time the print program is activated, as shown in FIG. 3(a), the personal computer 1 performs a monitor calibration operation in S210 to calculate the display characteristic of the display 2. Then in S220, the results of the monitor calibration operation are registered along with the particular ID number assigned to the display 2. In S230, the ID number is transmitted to the color printer 6 and registered in the non-volatile RAM (NVRAM) of the color printer 6. Then in S240, the monitor calibration results and print information are outputted to the color printer 6.

The next and further times that the print program is activated, as shown in FIG. 3(b), in S250 the ID number that corresponds to the color display 2 for which the monitor calibration operation was performed in S210 and that was stored in the color printer 6 in S230 is retrieved from the color printer 6. Then it is determined in S260 whether or not the ID number stored in the color printer 6 in S230 matches the ID number of the presently connected color display 2. If not (S260:NO), then is S270 the monitor calibration operation is again performed. In S280, the results of the monitor calibration operation performed in S270 and the ID number of the presently connected color display 2 are registered. Then, in S290, the ID number is transmitted to the color printer 6 and registered in the NVRAM of the color printer 6. In S300, the calibration results and print information are outputted to the color printer 6.

When it is determined in S260 that the ID numbers match (S50:YES), then the program proceeds directly to S300, whereupon the presently registered calibration results are outputted with print information to the color printer 6.

As shown in FIG. 3(c), the color printer 6 determines in S310 whether or not it has received an ID number from the personal computer 1. If so (S310:YES), then in S320 and ID number is registered in the NVRAM of the color printer 6. Next, whether or not an ID number transmission command has been received from the personal computer 1 is determined in S330. If so (S330:YES), then, in S340, the color printer 6 transmits the ID number registered in its NVRAM to the personal computer 1. Then, whether or not print information has been received from the personal computer 1 is determined in S350. If so (S350:YES), then, in S360, the inputted values are corrected based on the calibration results accompanying the print information. Then, printing is performed in S370.

With this configuration, monitor calibration is automatically performed when the color display 2 connected to the personal computer 1 is exchanged for a different one. As a result, even if the configuration of the printer system changes, printing can always be performed based on proper calibration results so that printed colors will always match displayed colors.

Next, a printer system according to a third embodiment of the present invention will be described while referring to FIGS. 4, 5 and 6.

The printer system of the third embodiment includes the same components as the printer system explained with reference to FIG. 1 in the first embodiment. In the third embodiment, however, the personal computer 1 is installed with a print program represented by the flowchart of FIG. 4 and the color printer 6 is installed with a program represented by the flowchart of FIG. 5.

Also, an ID table shown in FIG. 6 is stored in the NVRAM of the color printer 6. The ID table stores the ID numbers of various color displays 2 in correspondence with when monitor calibration was performed for each color display 2 and with color correction information.

First, in S410, the print program is started in the personal computer 1 and whether or not a print command has been received is determined. If so (S410:YES), then, in S420, the personal computer 1 notifies the color printer 6 of the particular ID number assigned to the color display 2. Then, in S430, whether a no good (NG) message or an OK signal has been received from the color printer 6 is determined. Once a message has been received (S430:YES), then, in S440, it is determined whether the message is an NG message or an OK message. When the message is an NG message (S440:NG), then monitor calibration operations are performed in S450. In S460, the personal computer 1 transmits a notification to the color printer 6. The notification includes color correction information based on the calibration results from S450, the ID number of the color display 2, and the date on which the monitor calibration was performed. In S470, print information is outputted to the color printer 6. On the other hand, when, in S430, it is determined that an OK message has been received from the color printer 6 (S440:OK), then the program skips S450 and S460 and proceeds directly to S470.

Figure 5:
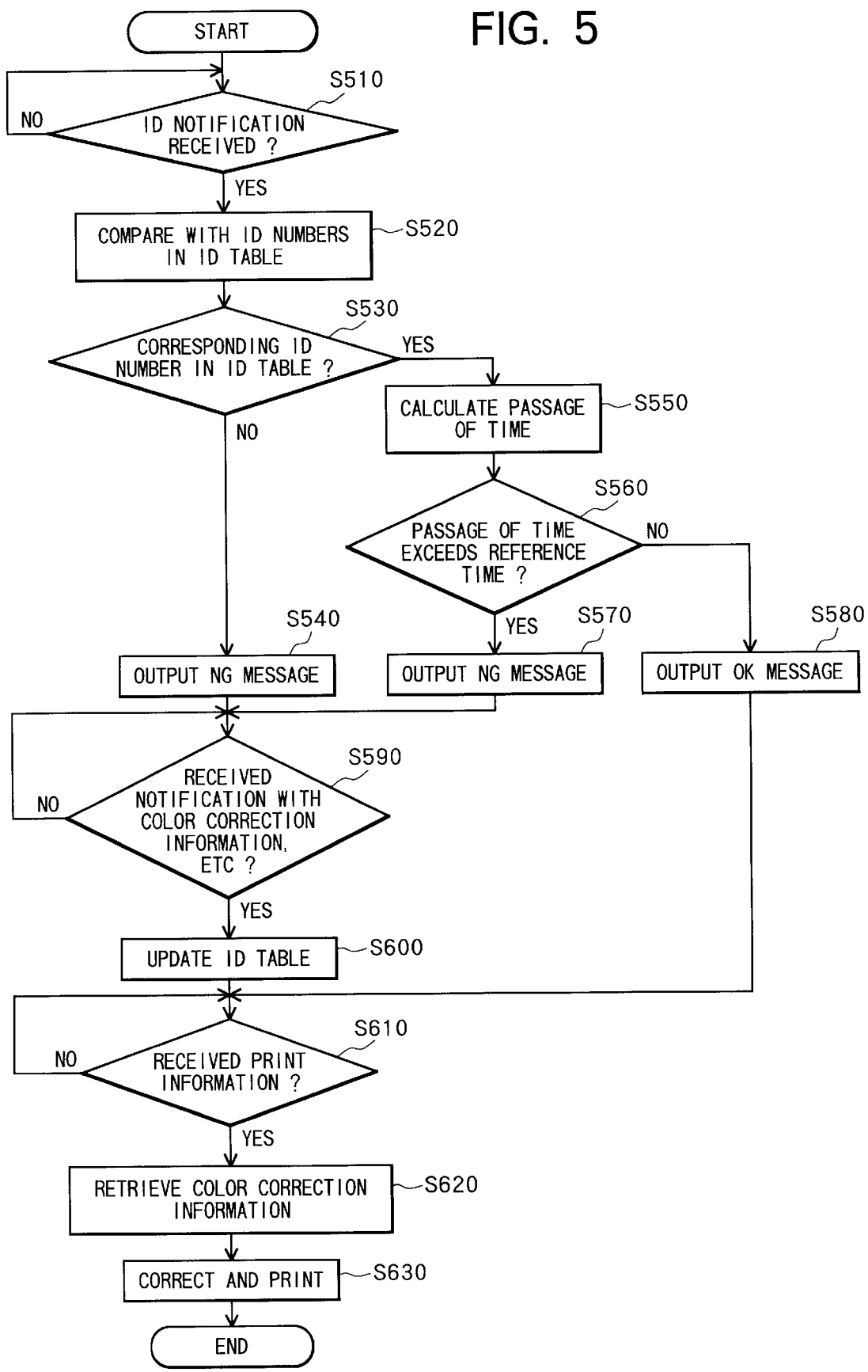
FIG. 5 is a flowchart representing a print program executed by a color printer according to the third embodiment.

In the meantime, the corresponding program is performed in the color printer 6 as indicated by the flowchart in FIG. 5. First, it is determined in S510 whether or not the color printer 6 has received an ID number notification from the personal computer 1, that is, the ID number notification that the personal computer 1 outputted in S420. When the color printer 6 receives an ID number notification (S510:YES), then the ID number contained in the ID number notification is compared with the ID numbers stored in the ID table. Then, it is determined in S530 whether or not any of the ID numbers stored in the ID table matches the ID number in the ID notification. When no corresponding ID number is stored in the ID table (S530:NO), the color printer 6 outputs an NG message to the personal computer 1 in S540.

When a corresponding ID number is stored in the ID table (S530:YES), then, in S550, the amount of time passed since monitor calibration was last performed for the subject color display 2 is calculated based on the present time and date and the time and date registered in the ID table. Then, whether or not the amount of time passed exceeds a predetermined reference time duration is determined in S560. If so (S560:YES), then, in S570, the color printer 6 outputs an NG message to the personal computer 1. If the amount of time passed does not exceed the predetermined reference time duration (S560:NO), then the color printer 6 outputs an OK message to the personal computer 1 in S580.

Figure 4:
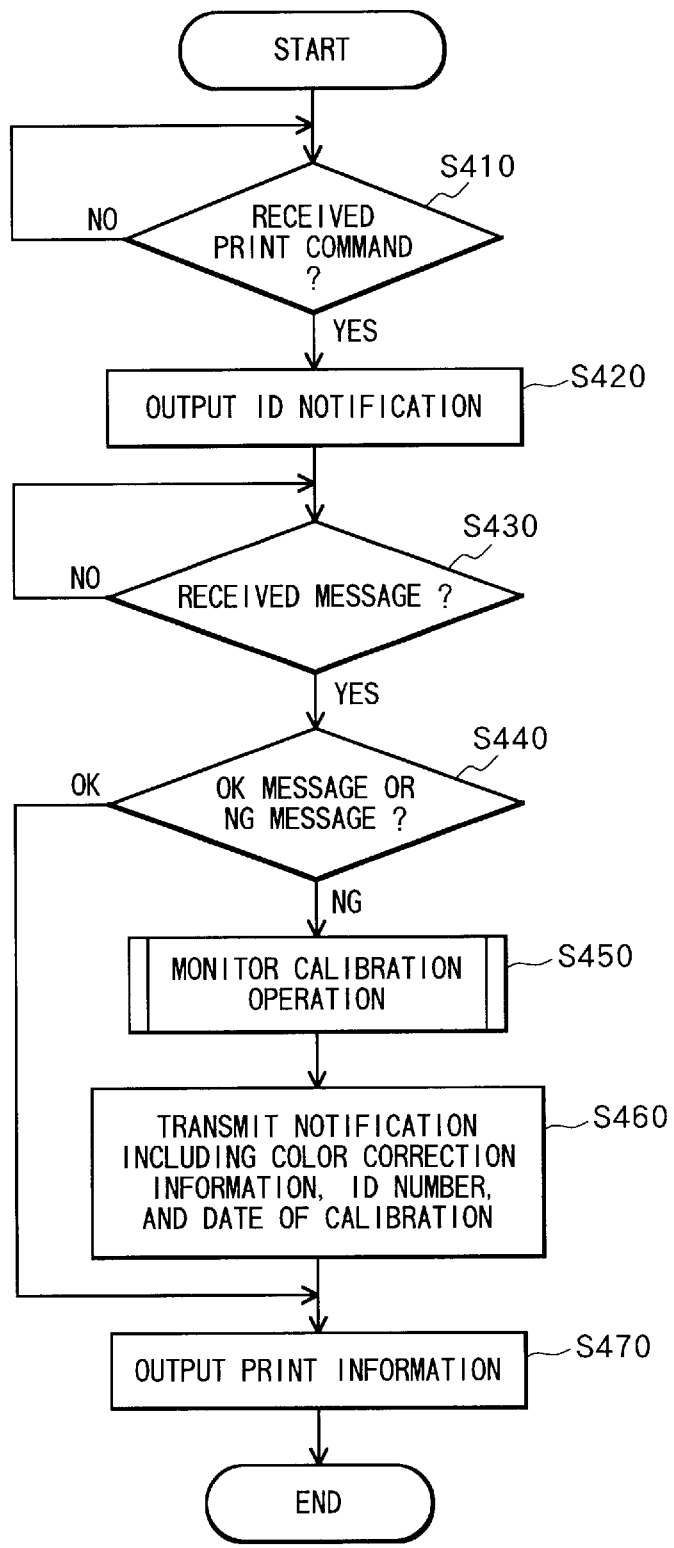
FIG. 4 is a flowchart representing a print program executed by a personal computer according to a third embodiment of the present invention.

It should be noted that in S430 of FIG. 4, the personal computer 1 receives the NG messages outputted in S540 and in S570 and the OK message outputted in S580. After the color printer 6 outputs NG messages in S540 or in S570, then, in S590, it is determined whether or not the color printer 6 has received the notification outputted from the personal computer 1 in S460. The notification awaited in S590 includes color correction information based on the calibration results from S540, the ID number of the color display 2, and the date on which the monitor calibration was performed. Once the notification has been received (S590:YES), then the ID table is updated accordingly in S600. Next, whether or not print information has been received is determined in S610. Once print information has been received (S610:YES), then, in S620, the color correction information corresponding to the ID number received in S510 is retrieved from the ID table. Then, the printing information is corrected accordingly and printing is performed in S630.

With this configuration, monitor calibration is automatically updated when the color display 2 connected to the personal computer 1 is exchanged for a different one or when the an excessive duration of time has elapsed since monitor calibration was last performed. As a result, the color printer 6 will always be provided with the update and appropriate color correction information. Accordingly, color printing will always be performed so that the printed colors match the colors displayed on the color display 2.

It should be noted that the monitor calibration described in the above embodiments is well known in the art, so detailed description thereof is not necessary.

While the invention has been described in detail with reference to specific embodiments thereof, it would be apparent to those skilled in the art that various changes and modifications may be made therein without departing from the spirit of the invention, the scope of which is defined by the attached claims.

For example, the present invention can be applied to a printer system connected with a monochrome display capable of tonal display and a printer capable of tonal printing.

Also, the personal computer 1 can be modified so that before the personal computer 1 executes the monitor calibration operation, it confirms with the user whether he or she wishes the monitor calibration operation to be performed. The personal computer 1 can further be provided with default color correction information so that when the user selects that he or she does not wish the monitor calibration operation to be performed, then the personal computer 1 can temporarily use the default color correction information.

What is claimed is:

1. A printer system comprising:

a display;

a printer;

an image data producing unit connected to said display and said printer, said image data producing unit producing image data to be inputted to said display and said printer, the image data having an input level when inputted thereto;

a display characteristic calculation unit that calculates a display characteristic relating to the input level of the image data inputted to said display versus a relative brightness of an image displayed on said display in response to the image data and that outputs a calculated display characteristic;

a display characteristic memory that stores information relating to the calculated display characteristic;

a print data adjusting unit that adjusts, based on the information relating to the calculated display characteristic stored in said display characteristic memory, the input level of the image data inputted to the printer so that an image printed by said printer substantially matches with the image displayed on said display;

a necessity determination unit that automatically determines necessity of said display characteristic calculation unit to calculate the display characteristic; and a calculation operation execution unit that executes a calculation operation of said display characteristic calculation unit when said necessity determination unit determines it is necessary for said display characteristic calculation unit to determine the display characteristic.

2. The printer system as claimed in claim 1, wherein said display characteristic memory stores the information relating to the calculated display characteristic along with a time when the information is stored in said display characteristic memory.

3. The printer system as claimed in claim 2, wherein said necessity determination unit determines it is necessary for said display characteristic calculation unit to determine the display characteristic when a time duration from the time stored in said display characteristic memory to a present time exceeds a predetermined time duration.

4. The printer system as claimed in claim 3, wherein the time duration and the predetermined time duration are measured on a day basis.

5. The printer system as claimed in claim 1, wherein said display characteristic memory updates the information when said necessity determination unit determines it is necessary for said display characteristic calculation unit to determine the display characteristic.

6. The printer system as claimed in claim 5, wherein said display characteristic memory updates the time when the information stored therein is updated.

7. The printer system as claimed in claim 6, wherein said necessity determination unit determines it is necessary for said display characteristic calculation unit to determine the display characteristic when a time duration from the updated time stored in said display characteristic memory to a present time exceeds a predetermined time duration.

8. The printer system as claimed in claim 7, wherein the time duration and the predetermined time duration are measured on a day basis.

9. The printer system as claimed in claim 1, wherein said necessity determination unit determines it is necessary for said display characteristic calculation unit to determine the display characteristic based on ID information relation to said display connected to said image data producing unit.

10. A printer system comprising:

a display;

a printer;

an image data producing unit connected to said display and said printer, said image data producing unit producing image data to be inputted to said display and said printer, the image data having an input level when inputted thereto;

a display characteristic calculation unit that calculates a display characteristic relating to the input level of the image data inputted to said display versus a relative brightness of an image displayed on said display in response to the image data and that outputs a calculated display characteristic;

a display characteristic memory that stores information relating to the calculated display characteristic;

a print data adjusting unit that adjusts, based on the information relating to the calculated display characteristic stored in said display characteristic memory, the input level of the image data inputted to the printer so that an image printed by said printer substantially matches with the image displayed on said display;

a time memory that stores time when said display characteristic calculation unit calculates the display characteristic;

a necessity determination unit that calculates, based on the time stored in said time memory and a present time, a time duration from when said display characteristic calculation unit calculates a previous display characteristic to the present time and that determines necessity of said display characteristic calculation unit to determine the display characteristic when the time duration exceeds a predetermined reference time; and a calculation operation execution unit that executes a calculation operation of said display characteristic calculation unit when said necessity determination unit determines it is necessary for said display characteristic calculation unit to determine the display characteristic.

11. A printer system comprising:

a display;

a printer;

an image data producing unit connected to said display and said printer, said image data producing unit producing image data to be inputted to said display and said printer, the image data having an input level when inputted thereto;

a display characteristic calculation unit that calculates a display characteristic relating to the input level of the image data inputted to said display versus a relative brightness of an image displayed on said display in response to the image data and that outputs a calculated display characteristic;

a display characteristic memory that stores information relating to the calculated display characteristic;

a print data adjusting unit that adjusts, based on the information relating to the calculated display characteristic stored in said display characteristic memory, the input level of the image data inputted to the printer so that an image printed by said printer substantially matches with the image displayed on said display;

an ID information memory storing ID information relating to usable displays, display characteristics of the usable displays being calculated by said display characteristic calculation unit;

a necessity determination unit that determines necessity of said display characteristic calculation unit to determine the display characteristic when the ID information stored in said ID information memory and an ID information relating to said display connected to said image data producing unit are not in coincidence with each other; and a calculation operation execution unit that executes a calculation operation of said display characteristic calculation unit when said necessity determination unit determines it is necessary for said display characteristic calculation unit to determine the display characteristic.

\* \* \* \* \*